June 22, 1971

G. W. MORSE 3,585,730

METHOD AND APPARATUS FOR THE PRESERVATION
OF NUTRIENTS IN FORAGE

Filed Jan. 17, 1969

INVENTOR.
George W. Morse
BY
Attorneys

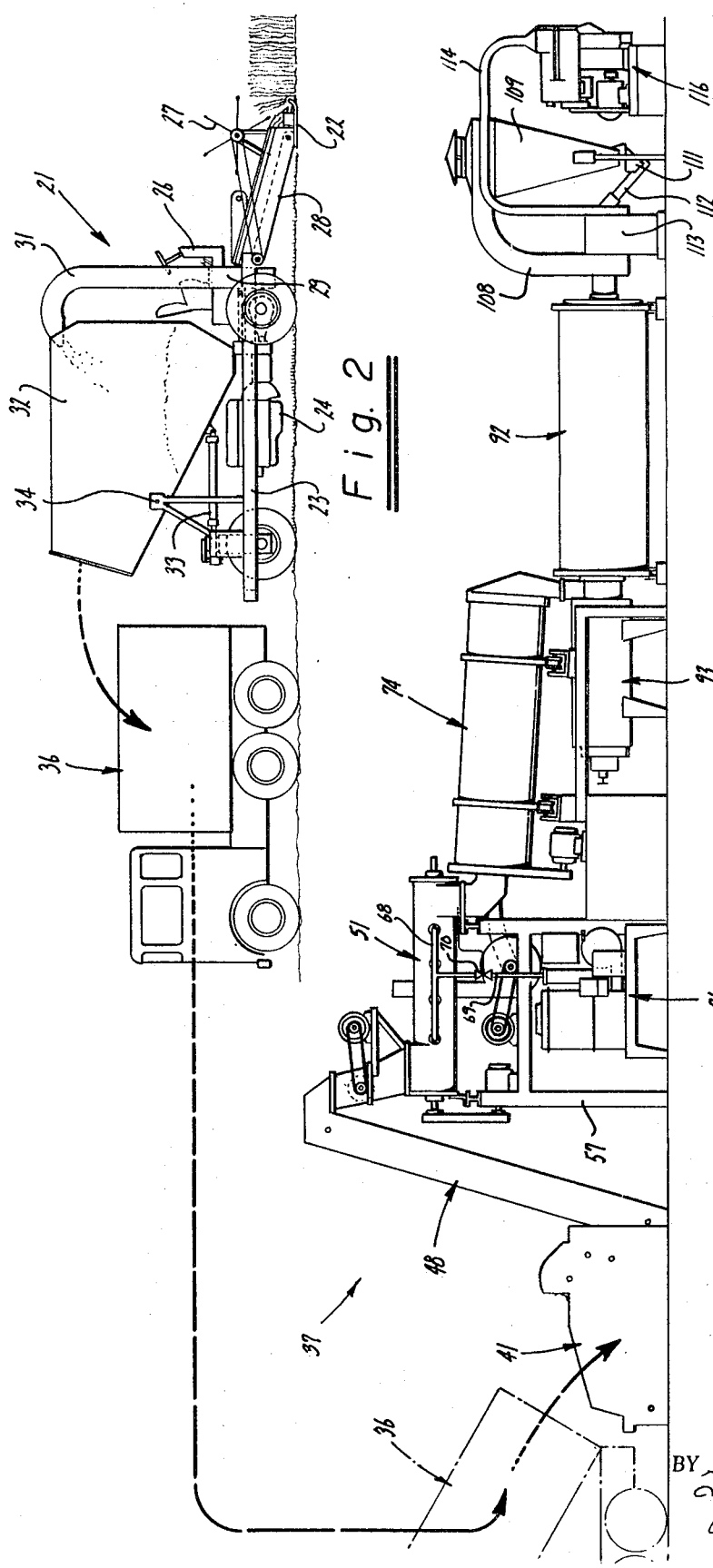

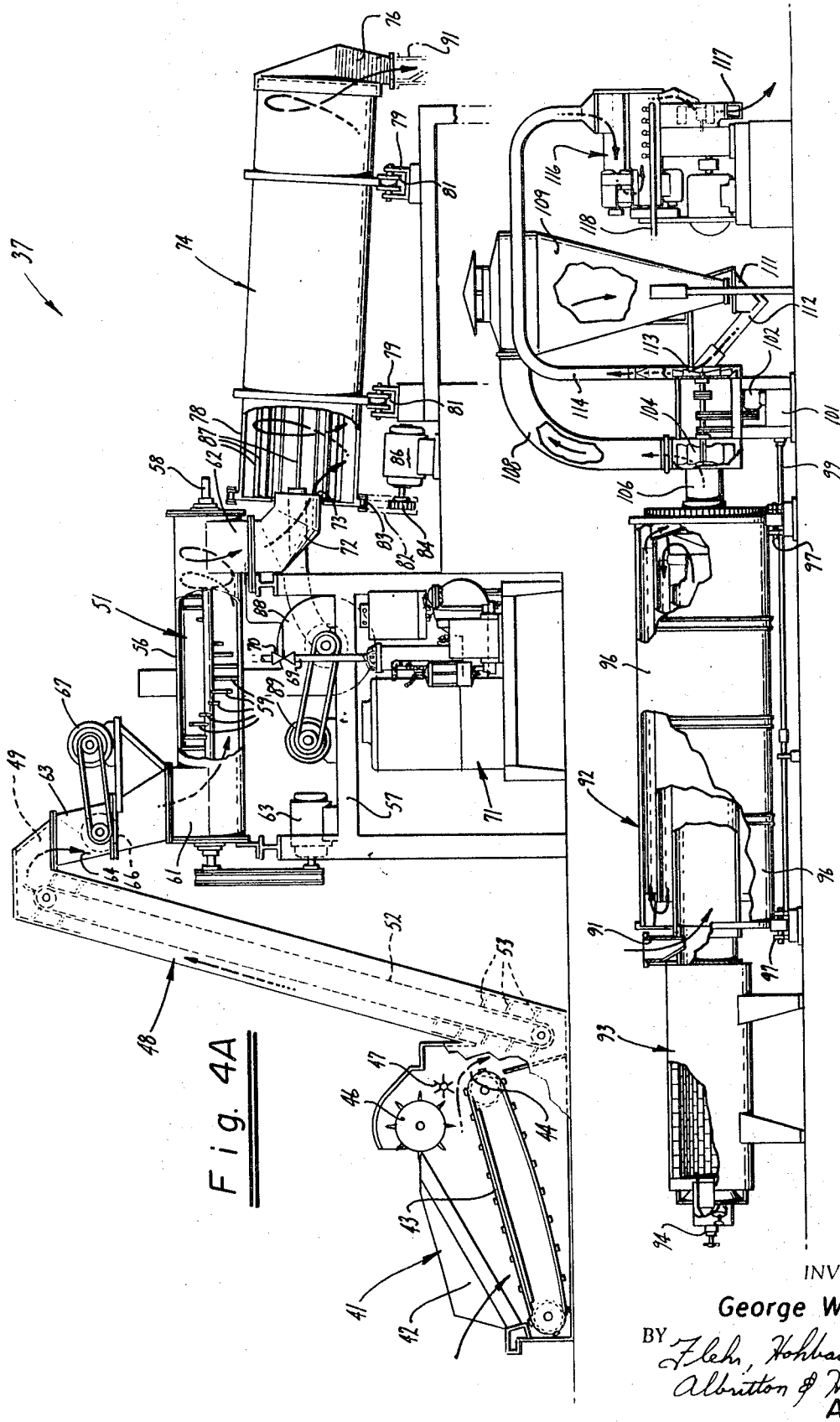

This invention relates to a method and apparatus for United States Patent Office 3,585,730
Patented June 22, 1971

3,585,730
METHOD AND APPARATUS FOR THE PRESERVATION OF NUTRIENTS IN FORAGE
George W. Morse, 9673 Melrose Ave.,
Elk Grove, Calif. 95624
Filed Jan. 17, 1969, Ser. No. 792,049
Int. Cl. F26b 7/00
U.S. Cl. 34—17                          17 Claims

ABSTRACT OF THE DISCLOSURE

A method and apparatus for preserving nutrient in hay by rapidly heating freshly cut hay to arrest enzymatic degradation without damage to forage. Forage is exposed to steam, preferably super-heated, for up to five seconds. The apparatus comprises means for feeding forage to a steam treating drum where enzymes are destroyed and a first dryer means for both the mobile and stationary apparatus. In the stationary apparatus, a second dryer means is used and in the mobile apparatus sun drying is used, to provide dried forage with the nutrients preserved.

BACKGROUND OF THE INVENTION

It has long been known that fresh cut hay loses a considerable amount of its nutrients when left in the open sun to cure. However, even where forage is dried mechanically and stored out of the sun, degradation of the nutrients still occurs. Many workers have attempted to preserve various kinds of nutrients in hay through the use of variations in drying technique, handling technique, storing technique and by the addition of various reagents. However, while some of the prior techniques serve to preserve certain nutrients to varying extents, there has not been a satisfactory technique for inhibiting the losses of xanthophyll and other labile factors in forage between the time it is cut and dried.

Among the various yellow pigments in green leaves, the hydroxy carotenoids (xanthophyll) are the most important poultry pigmenters. Controlled amounts of dehydrated alfalfa and grass products are added to poultry rations because of the yellow coloring they impart to the skin of broilers and to egg yolk.

Xanthophylls constitute a very complex mixture of chemical entities. The five major xanthophylls of fresh leaves are lutein, zeaxanthin, violaxanthin, neoxanthin, and cryptoxanthin. In the fresh plant, these occur as the all-trans isomers (with the possible exception of neoxanthin) but are partially converted to cis-isomers during dehydration.

It is not precisely known what chemical changes take place during curing. It is believed that enzymes, under suitable moisture and temperature conditions, serve to catalyze the destruction of xanthophylls.

While heat treatment to destroy enzymes has been suggested in the prior art, as in the case of blanching for home cooking, most heat treating processes serve to actually increase the degradation. This is probably because the heating of forage serves to accelerate the oxidative or degradative reaction caused by the enzymes up to the point where the enzymes are destroyed. In forage, heating during dehydration under normal practices fails to destroy the enzymes apparently because they are encased within the cellulosic or polymeric shells of the cut fibers. Additional heating of the dried forage simply serves to degrade the forage, rather than destroy the enzymes. Therefore, there is a need for a new and improved method and apparatus for the preservation of nutrients in forage.

SUMMARY OF THE INVENTION AND OBJECTS

This invention relates to a method and apparatus for preserving nutrients in forage without degradation of the forage More particularly, the invention relates to rapid heating of freshly cut forage to arrest enzymatic degradation.

In general, it is an object of this invention to provide an improved method of preserving the nutrients in forage.

Another object of this invention is to provide a method of destroying enzymes in forage without expensive chemical reagents or solvents.

Another object of this invention is to provide a method of increasing the yield of xanthophylls and other labile factors in dried forage.

Another object of this invention is to provide an improved apparatus for carrying out the foregoing method.

Another object of the invention is to provide an improved apparatus of the above character which can be can be either mobile or stationary.

BRIEF DESCRIPTION OF THE DRAWING

FIG. 2 is a side elevational view of a self-propelled harvesting equipment.

FIG. 3 is a side elevational view of apparatus incorporating the present invention and of the type employed at a fixed location.

FIGS. 4A and 4B are enlarged detail views of the apparatus shown in FIG. 3 with certain portions broken away.

DESCRIPTION OF THE PREFERRED EMBODIMENTS

Figure 1:
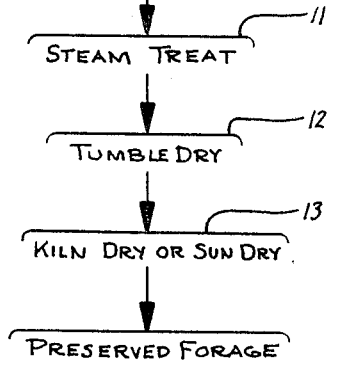
FIG. 1 is a flow sheet illustrating the method of the present invention.

Referring to FIG. 1, according to the method of this invention, cut forage is treated with steam in step 11. Because of the cellular structure forage, and because of the known tendency of stomata to close upon cutting of any plant, it is desirable to steam treat in step 11 as soon as possible after cutting the forage. Destruction of xanthophylls commences, it is believed, immediately upon cutting of the forage. While the precise chemical mechanism is not understood, it appears that removal of the green leaves and upper portions of plants from the nutrient-supplying roots triggers a response which often unlocks the catalytic enzymes which commence the oxidative degradation of xanthophylls and other labiles.

In the steam treatment step 11, the forage is subjected instantaneously to a temperature sufficient to arrest the enzymatic degradation of nutrients without damage to the forage. The instantaneous heating gives substantial improvements in nutrient content of the dried forage because the nutrients are not lost during the drying process to the extent that loss normally occurs. It is desirable that this treatment be as short as possible, i.e., less than one minute, to prevent degradation of the forage and preferably should be accomplished within a period of less than five seconds. In most instances heat treatment should not exceed 30 seconds. However, periods up to approximately one minute may give satisfactory results, depending upon the forage and temperature.

The steam used in step 11 should have a temperature ranging from between 212° F. to 400° F. This steam is utilized to heat the forage very rapidly to the desired temperature to deactivate the enzymes. Typically, for a good quality hay, this is a temperature ranging from 160° to 170° F., for very wet hay this is a temperature ranging from 150° F. to 165° F. and for weedy or poor quality hay, this is a temperature ranging from 165° F. to 185° F. In order to deactivate all the enzymes in the stem and leaf fragments of the forage, it is desirable to heat the stem and leaf fragments all the way through. Because of this fact, the surface temperatures of the stem and leaf fragments may be higher than the temperatures specified above. When the high temperature steam is utilized, it is very possible that the surface temperature of the stem and leaf fragments may approach 212° F. for a short period of time. Since enzymatic activity normally increases with increasing temperatures up to the point where the enzymes are destroyed, shorter times and, therefore, higher temperatures are most desirable. With many enzymes of concern here, temperatures ranging from 150° F. to 185° F. are high enough to destroy the enzymes, provided the temperature of the material is elevated at the point where the enzymes are located and not merely at the surface of the stem and leaf fragments of the forage. For best results, steam is used to assure enzyme destruction; however, water blanching may be used. Using conventional equipment, steam temperatures ranging from 212° F. to 400° F. may readily be obtained. It is generally desirable that the temperature of the steam be relatively high so that instantaneous heating of the forage can be obtained.

After the forage has been steam treated in step 11, it is tumble dried in step 12. This step is conveniently carried out by moving an air stream through the forage as it is being tumbled. By having step 12 closely follow step 11, the retained heat within the forage from step 11 serves to facilitate removal of substantial amounts of moisture from the forage. Even where moist steam is used in step 11, the elevated temperatures permit fairly rapid dehydration in step 12. However, since dehydration is a goal of the process, it is desirable that steam as dry as conveniently available be used in step 12.

After the forage has been tumble dried in step 12, it is further dried in step 13 in a kiln or dryer or sun dried. Preferably for forage, after step 13, has a moisture content below approximately 12%. The preserved product of step 13 is dehydrated to the extent desired. Depending on relative humidity, temperatures and contemplated use of the forage, any suitable moisture content below about 14% may be selected by controlling the dwell time and temperature in drying steps 13. Thereafter, the kiln-dried cut forage can be treated in any conventional manner such as by running the same through a pellet mill to provide preserved forage in the form of wafers or pellets. Alternatively, the preserved product may be further dehydrated as by sun drying in the field. Since the degrading enzymes have been previously inactivated, sun drying may now take place without the usual severe loss of labile factors.

A more specific description of the method will be given in conjunction with the operation of the apparatus hereinafter described.

The forage which is processed in accordance with the present method is cut in the field at a proper stage of maturity by conventional equipment such as that shown in FIG. 2. As shown in FIG. 2, this equipment can consist of a self-propelled harvesting unit 21 which is provided with a cutter bar assembly 22 for mowing a crop of a suitable type such as alfalfa. The cutter bar assembly 22 is carried by a wheeled framework 23. A power unit 24 is mounted upon the framework and is utilized for driving the wheeled framework from a driving station 26. The power unit also drives a reel 27 which moves the alfalfa into the cutter bar. The cut alfalfa is then elevated by an apron conveyor 28 into a chopper 29 which chops the alfalfa into relatively short lengths where it is blown upwardly through a pipe 31 and discharged into a large holding bin 32 which is mounted on the framework 23.

Means is provided which includes an actuator 33 for raising the holding bin 32 about a pivot axis 34 to dump the holding bin after it is filled with the freshly chopped material to dump the same into a conventional truck 36 which immediately conveys the freshly chopped material to the stationary dehydration plant 37 which is shown in FIG. 3.

The stationary plant 37 is shown in FIGS. 4A and 4B and consists of a dehydration feeder 41 of a conventional type which is provided with a large inlet 42 to receive the chopped forage as it is dumped from the truck 36. The chopped forage is advanced by a large endless feeder apron 43 which is adjustable in speed to deliver the chopped forage at a measured rate at the discharge end 44 of the feeder 41. A levelling reel 46 is provided adjacent the discharge end 44 of the feeder 41 and helps to assure uniform delivery of the chopped forage to the discharge end 44.

The chopped forage is delivered at a metered rate by the feeder 41 to the inlet end of an elevator 48 which discharges the chopped forage at an elevated position through a discharge outlet 49 into a steam treatment unit 51. The elevator 48 is of a conventional type and includes an endless belt 52 which carries a plurality of lifting vanes 53.

The steam treatment unit 51 consists of a casing 56 which is generally cylindrical and has its longitudinal axis generally horizontal and which is mounted upon a framework 57. A shaft 58 is rotatably mounted within the casing 56 and carries a plurality of teeth 59 arranged in a helix extending longitudinally of the casing 56. The casing 56 is provided with an inlet 61 and an outlet 62. The shaft 58 is driven by a motor 63 mounted upon the framework 57, and is rotated in such a direction so that the helical mounted teeth 59 advance the forage to the right as viewed in FIG. 4A and to discharge the same through the outlet or discharge chute 62. An inlet hopper 63 feeds into a cylindrical choke section 64 which is mounted on the inlet of the casing 56. A screw 66 is rotatably mounted in the choke section 64 and is rotated by a motor 67. A steam manifold 68 is mounted on one side of the casing 56 and is supplied with steam from a steam line 69. Steam leakage from the casing 56 is inhibited by the screw 66 in the choke section 64.

The steam is supplied to the line 69 at a desired temperature through a motor operated control or pressure regulating valve 70, from a steam generating apparatus 71 mounted below the framework 57. The valve 70 is operated by a temperature sensing bulb (not shown) inserted in the flow of material in the discharge chute 62 and connected to the valve 70 by a cable 70. The temperature is adjusted to the lowest temperature which results in the desired effect on the particular forage being treated. The steam generating apparatus 71 is of a conventional type and, therefore, will not be described in detail. It, however, should be capable of delivering steam at a temperature ranging from 160° to 400° F. which can be readily accomplished by those skilled in the art by the use of pressure to obtain the temperature range.

After the chopped forage has been treated with steam, it is discharged from the steam treatment unit 51 through a discharge chute 72 into the inlet 73 of a tumble dryer 74. The tumble dryer 74 is provided with a discharge outlet 76. The tumble dryer 74 consists of a cylindrical drum 77 which has a pair of spaced running bands 78 mounted on the exterior of the same. The bands 78 seat in a pair of spaced trunnion assemblies 79 which include double flange rollers 81 which engage the bands. The drum 77 is rotated by a roller chain 82 engaging teeth 83 carried by the drum at its inlet end. The chain is driven by a sprocket 84 which is driven by a motor 86. A plurality of blades 87 are mounted within the drum 77 and extend longitudinally of the same and are spaced radially about the drum. The blades facilitate drying of the chopped forage as hereinafter described. During the time that the forage is being tumbled in the tumble dryer 74, atmospheric air under vacuum is drawn into the outlet of the tumble dryer 74 by a blower 88 driven by a motor 89, both of which are mounted upon the framework 57.

After the chopped material passes through the tumble dryer 74, it is introduced into the inlet 91 of a kiln or dryer 92 or to a feed storage bin (not shown). The kiln dryer 92 is supplied with heat from a furnace 93. The kiln 92 and furnace 93 are of a conventional type and, therefore, will not be described in detail. In general, the furnace 93 is provided with a burner 94 which produces a drying medium composed of heated air which is delivered to the inlet end of the kiln or dryer 92. The kiln or dryer 92 consists of a three-pass drum 96, however, a single pass drum can be used. The drum 96 is rotatably mounted upon a pair of spaced trunnion assemblies 97 engaging opposite ends of the drum 96. The drum 96 is rotated by a roller chain 98 which is driven by a sprocket (not shown) and which, in turn, is driven by a shaft 99 driven from a speed reducing unit 101 that is driven by a motor 102. The motor 102 also drives a large fan 104 mounted in the discharge outlet 106 of the drum 96.

The drum 96 can include three cylinders which are concentrically arranged therein and mechanically interlocked so that they all rotate at the same speed. The chopped material is supplied to the inlet end of the kiln 92 and is repeatedly carried to the top of each cylinder by built-in flights (not shown) and showered through the hot gases passing through the kiln. The chopped material advances through the drum and the air stream which is created by the large fan 104. The chopped material continues to give off moisture as it progresses forward through the cylinder and then back through the intermediate cylinder and forward again through the outer cylinder to the fan 104 at the discharge end. As the chopped and dried material is received by the fan 104, it is delivered upwardly through a large air lift pipe 108 to a primary storage collector 109 of the cyclone type in which the dried product or material is separated from the moist air. This completes the process and apparatus insofar as the present invention is concerned. However, as shown in FIG. 4A, the dried or preserved forage can be processed still further into pellets. To accomplish this, the dried material is discharged at the bottom end of the collector 109 into a hopper 111 and is delivered through an air lift pipe 112 upwardly into a combination cooling and grinding mill 113 which reduces the dried chopped material into relatively fine material which is conveyed upwardly through an air lift pipe 114 where it is delivered to a pellet mill 116 of the conventional type. As is well known to those skilled in the art, such a pellet mill is adapted to form pellets from the powdered material which is supplied to the same and to discharge them through the discharge opening 117. As is also known to those skilled in the art, the pellet mill is provided with means for mixing steam with the ground material as it is delivered to the pellet mill. The steam is supplied to the pellet mill through the steam pipe 118 which can be connected to the steam generator 71.

Operation of the apparatus shown in FIGS. 4A and 4B in performing the present method may now be briefly described as follows.

Let it be assumed that the forage to be processed is alfalfa and that, as explained previously, the alfalfa is cut when it is in the proper condition and is delivered immediately to the stationary dehydration unit by the truck 36. This chopped alfalfa is processed immediately in the plant and is delivered in metered quantities to the steam treatment unit 51. As soon as the chopped forage enters the steam treatment unit 51, it is subjected to a plurality of jets of steam which contact all stem and leaf fragments of the forage because of the rotation of the paddle shaft 58 within the casing 56. As can be seen, the steam is also restricted from leaking out of the inlet so that as the chopped forage enters the drum 56 it will continue to be subjected to steam whereby every stem and leaf fragment of the forage is subjected to steam while it is within the steam treatment unit 51. In this way, it can be seen that the chopped forage is subjected instantaneously to a relatively high temperature which is sufficient to arrest enzymatic degradation of nutrients within the forage without damaging the forage. It is believed that the steam is particularly desirable for this purpose because the steam, upon condensation upon the hay, releases a tremendous amount of heat which heats the forage in such a manner that the enzymatic degradation is arrested.

In accordance with the present process, it is important that the enzymatic action be halted very rapidly because it has been found that if there is only a slow or gradual heating process, their activity may in fact be accelerated rather than halted.

It has been found that the instantaneous heat treatment of the chopped forage is particularly desirable for the preservation of xanthophyll and carotene. It also has been found that the process is beneficial for preserving other nutrients within the forage because by toughening the leaf connections to the stems, leaf loss becomes negligible thereby increasing the yield of proteins.

It is generally desirable that the heat treatment of the chopped forage be as instantaneous as possible. For example, we have found it desirable to destroy or halt all enzymatic activity within five seconds. However, less desirable and still satisfactory results can be obtained up through a period of approximately one minute. Although the present process has been described principally with the use of steam, water can be used if desired. In general, it is desirable to utilize a product temperature ranging from 150° to 212° F.

After the chopped forage has been subjected to the instantaneous heat treatment, the chopped forage is delivered to the tumble dryer 74. The tumbler dryer 74 is utilized for removing some of the moisture carried by the chopped forage and particularly that moisture which has been formed by the condensation of the steam thereon. This removal of the excess moisture from the chopped forage is facilitated by the blower 88. The chopped material is then dried in the kiln or dryer 92, after which it is delivered to the pellet mill and pelletized as hereinbefore described.

EXAMPLE 1

This example relates to the preservation and dehydration of one ton of alfalfa which was freshly cut and determined to be at ambient temperature of 70° F. and 76% moisture. The alfalfa was introduced into a steam treatment unit (51 shown in FIG. 4A) and subjected to steam at approximately 212° F. under 2 to 3 p.s.i. pressure. Because of the moisture pickup on steam treatment, the alfalfa transferred to the tumble dryer weighed 2200 pounds and had a moisture content of 78.2%. The temperature of the steam treated alfalfa averaged 178° F. on entry into the tumble dryer. In the tumble dryer, ambient air was introduced at the discharge end having 20% relative humidity, 80° F. After passing countercurrently over the moist alfalfa through the tumble dryer, the exhaust air was raised to 100% relative humidity at a temperature of 156° F. The net loss of water was 127 pounds, since the 20% R.H. air had 3 pounds of water and the exhaust had 130 pounds of water. The alfalfa, weighing 2073 pounds, was then transferred to the kiln dryer. At this point, the forage had 76.9% moisture content and a temperature of 95° F. Upon kiln drying, 1545 pounds of moisture passed out with the products of combustion, leaving 528 pounds of preserved dehydrated alfalfa having a moisture content of 10%.

By the foregoing process, it has been found that by heating the chopped forage up very rapidly, the enzymatic action is arrested to make possible dramatic increases in the xanthophyll content. By way of example, by treating the forage in the manner disclosed herein, it was found that it was possible to increase the xanthophyll content from 120 milligrams per pound of conventional dried forage in comparison to 300 milligrams per pound when the forage was treated in accordance with the present invention. In addition, it has been found that there are other benefits from the treatment of forage in this manner, including increased carotene or vitamin A content. Thus, it has been found that in accordance with the present invention in comparison with the dry material, the carotene content was increased by 300% and the xanthophyll content by 250%. It has been found with the present process that there is a much lesser tendency to dissipate or destroy the xanthophyll content of the forage by reduction of the moisture content.

Figure 5:
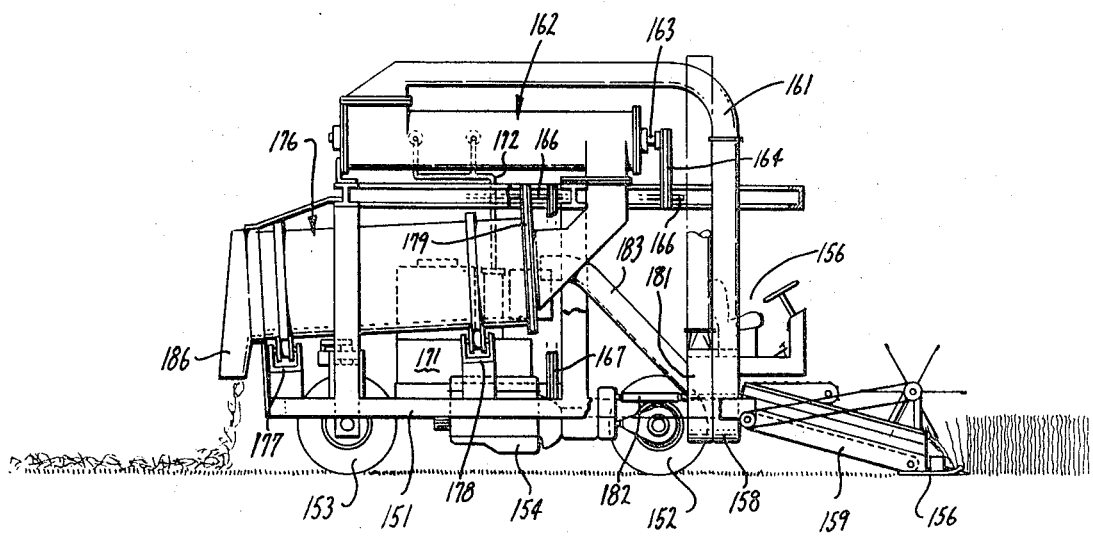
FIG. 5 is a side elevational view of apparatus incorporating the present invention of the type adapted for field use.
Figure 6:
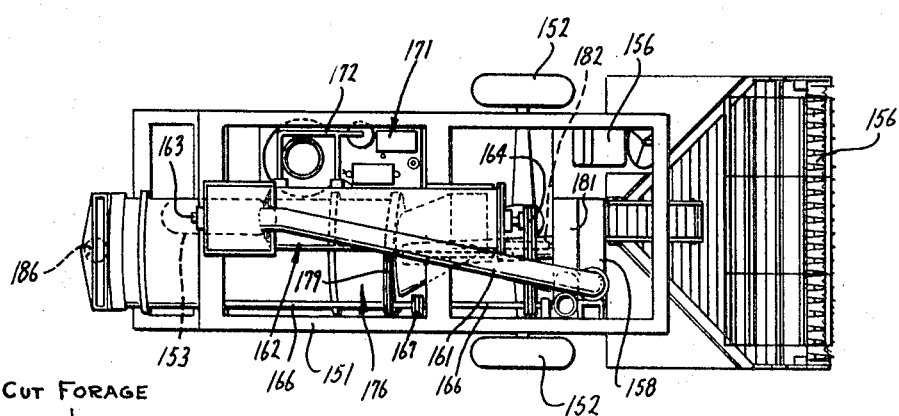
FIG. 6 is a plan view of the apparatus shown in FIG. 5.

Another embodiment of apparatus for performing the method of the present invention is shown in FIGS. 5 and 6. As shown therein, it is a field type self-propelled apparatus that consists of a framework 151 which is provided with front and rear ground-engaging wheels 152 and 153. An internal combustion engine 154 is mounted on the framework 151 and is provided for driving the wheels 152 and 153. A driving station 156 is mounted upon the framework and is provided for steering the apparatus and for operating the same. As in the previous embodiment, there is provided a cutter bar assembly 156 and a reel 156 which advances the crop to be cut into the cutter bar assembly 156. The forage is elevated into a chopper 158 by an apron 159. The chopped forage is then air lifted through piping 161 to the inlet end of a steam treatment unit 162. The steam treatment unit 162 is generally constructed in a manner similar to the steam treatment unit 51 and is utilized for heating the chopped forage substantially instantaneously to a temperature sufficient to arrest enzymatic degradation of the nutrients within the forage without damaging the forage in the manner hereinbefore described.

The shaft 163 of the steam treatment unit 162 is driven by a roller chain 164 which is driven by a jack shaft 166. The jack shaft 166 is driven by a roller chain 167 which is driven by the engine 154. The heat is supplied to the steam treatment unit 162 from a steam generator 171 of the type hereinbefore described. Steam is supplied from the generator 171 to the steam treatment unit 162 by a pipe 172. As hereinbefore described, the steam is introduced as a plurality of jets within the steam treatment unit 162.

The chopped forage, as it passes from the steam treatment unit 162, is supplied to a tumble dryer 176 of the type hereinbefore described. The tumble dryer 176 is rotatably carried by spaced trunnion assemblies 177 and 178. The tumble dryer 176 is driven by a roller chain 179 driven by the jack shaft 166. Air is drawn through the tumble dryer by a fan 181 driven through a power takeoff 182 from the engine 154. The fan draws air through a pipe 183 from the inlet end of the tumble dryer 176. The tumble dryer 176 is provided with a breaching 186 which is adapted to discharge the forage onto the ground behind the self-propelled field apparatus as it advances and to introduce ambient air.

The operation of this field type apparatus in many respects is very similar to the stationary type apparatus hereinbefore described. However, it can be seen that the field type apparatus has certain advantages. For example, the crop, as it is cut, can be subjected to the steam treatment immediately so that there is no loss of xanthophyll and other desirable properties in the forage while transporting it from the field to the stationary type unit.

After the forage has been rapidly brought up to a relatively high temperature by the steam, the chopped forage is introduced into the tumble dryer. As can be seen, the tumble dryer 176 lies in an inclined plane which is inclined downwardly to the rear so that as the chopped forage is dried, it will have a tendency to migrate to the rear of the field type apparatus. The air travels through the tumble dryer in a direction opposite or countercurrent the direction the material is advancing in the tumble type dryer.

It has been found that the tumble dryer 176 performs two functions. First, it has been found that the forage which has been treated with steam in the steam treatment unit 162 is very limp and difficult to dry in this form because it has a tendency to form a very tight mass which inhibits the passage of air therethrough. This tumble drying within the tumble dryer 176 dries the material sufficiently so as to eliminate this limp condition and to thereby accelerate the drying process. As the chopped forage passes through the tumble dryer, it is discharged to the rear of the field type apparatus as shown in FIG. 5 upon the stubble which remains. Since the chopped material has sufficient body, i.e., it is no longer limp, it will stay on top of the stubble to facilitate the subsequent sun drying and subsequent pickup. After one to seven days, depending upon the weather, the chopped forage will have dried sufficiently so that it can be taken directly to a pellet mill with little, if any, further drying, and formed into pellets. Alternatively, unchopped forage can be handled long and baled and processed at a later time.

Although the foregoing embodiments of the apparatus utilize chopping means for chopping the forage after it is cut, it should be appreciated that the present apparatus and the method performed by the apparatus can be utilized without the use of a chopper. When the forage in the present process is to be dehydrated, the forage should be chopped into relatively short lengths generally under 2½%. When the forage is to be sun-cured, then it is desirable that the forage be chopped into relatively long lengths, ranging from 6" to 8" or alternatively it can be left unchopped. Thereafter, the forage can be handled by conventional methods such as by baling or stacking.

In view of the foregoing, it can be seen that a greatly improved method has been provided for preserving the labile factors in forage and particularly xanthophyll and carotene. This can be accomplished either by stationary type apparatus or a field type apparatus.

What is claimed is:

1. A method of preserving nutrients in forage comprising the steps of heating freshly cut forage substantially instantaneously for a period of less than on minute in duration to a temperature between 150° F. and 400° F. sufficient to arrest enzymatic degradation of nutrients without forage damage.

2. A method as in claim 1 wherein said period is less than five seconds.

3. A method as in claim 1 wherein said heating of the forage is to a temperature between 150° F. to 212° F.

4. A method as in claim 1 wherein said heating is by the use of steam in temperature ranging between 212° F. and 400° F.

5. A method as in claim 1 wherein said heating is accomplished by introducing a plurality of jets of steam into the forage while the forage is being shifted about to ensure contact of the steam with all portions of the forage.

6. A method as in claim 5 together with the steps of tumbling the forage after it has been heated by the steam and passing air through the forage as it is being tumbled to remove moisture which has collected on the forage.

7. A method of preserving nutrients in forage comprising steam treating freshly cut forage to a temperature above 160° F. for less than one minute, and tumble drying to remove a substantial portion of the moisture collected on said forage.

8. A method as in claim 7 together with the steps of depositing the forage in the field after it has been tumble dried to permit the same to become sun dried and so that it has a relatively low moisture content and thereafter picking up the forage in the field after it has reached said desired moisture content.

9. A method as in claim 7 together with the steps of drying the chopped forage after it has been tumble dried so that it has a moisture content below approximately 14%.

10. In apparatus for the preserving of nutrients in forage, a steam treatment unit, means for introducing chopped forage into the steam treatment unit, means for supplying steam to the forage as it is introduced into the steam treatment unit so that the forage is subjected to a temperature between 150° F. and 400° F. for a period of less than one minute in duration sufficient to arrest enzymatic degradation of the nutrients within the forage and means for receiving the forage as it is discharged from the steam treatment unit for drying the same.

11. Apparatus as in claim 10 wherein said means for drying the same includes a tumble dryer, means for rotating the tumble dryer, and means mounted within the tumble dryer for causing the forage to be tumbled therein during rotation of the tumble dryer.

12. Apparatus as in claim 11 wherein said steam treatment unit includes a housing, a shaft rotatably mounted in the housing and a plurality of teeth carried by the shaft, and means for rotating the shaft and the teeth carried thereby to mix the forage with the steam.

13. Apparatus as in claim 12 wherein said apparatus is mobile and wherein said tumble dryer is provided with a breaching for depositing the forage onto the ground.

14. Apparatus as in claim 12 wherein said means for removing the moisture includes a kiln which is adapted to receive the chopped forage from the tumble dryer, said kiln including means for drying the forage so that the chopped forage will have a predetermined moisture content, and means for receiving the forage after it has been discharged from the kiln.

15. In apparatus for the preserving of nutrients in forage, a wheeled framework adapted to travel in a field, a steam treatment unit mounted on the framework, means carried by the framework for receiving chopped forage and introducing it into the steam treatment unit, means mounted on the framework for supplying steam to the steam treatment unit and to the forage in the steam treatment unit as it is introduced into the steam treatment unit so that the forage is subjected to a temperature between 150° F. and 400° F. for a period of less than one minute in duration sufficient to arrest enzymatic degradation of the nutrients within the forage, a tumble dryer mounted upon a framework for receiving the forage after it leaves the steam treatment unit, said tumble dryer serving to remove moisture from the forage as it passes therethrough, and means mounted upon the framework for supplying air to the tumble dryer to facilitate drying of the forage, said tumble dryer having a breaching for receiving the forage as it passes through the tumble dryer and depositing the same upon the ground.

16. Apparatus as in claim 15 together with means for cutting forage mounted on said wheeled framework.

17. Apparatus as in claim 16 wherein said steam treatment unit includes means for mixing the forage so that all portions of the forage come into contact with the steam together with a chopper mounted on said wheeled framework for chopping forage after it is cut and before it is delivered to the steam treatment unit.

References Cited

UNITED STATES PATENTS

| | | | |
|---|---|---|---|
| 107,680 | 9/1870 | Hanna | 34—68 |
| 217,986 | 7/1879 | Brown | 34—68 |
| 735,878 | 8/1903 | Hutton | 34—68 |
| 1,255,982 | 2/1918 | Byers | 56—10 |
| 2,339,757 | 1/1944 | Baer | 34—17 |
| 2,227,634 | 1/1941 | Dalin | 34—68 |
| 2,465,070 | 3/1949 | Demuth | 56—20 |
| 2,597,441 | 5/1952 | Borrow | 34—68 |
| 2,597,442 | 5/1952 | Borrow | 34—68 |
| 2,639,553 | 5/1953 | Russell | 56—1 |
| 2,698,170 | 12/1954 | Foley | 56—1 |
| 2,756,554 | 7/1956 | Diehl | 56—1 |
| 3,257,785 | 6/1966 | Rimes | 56—10 |

WILLIAM J. WYE, Primary Examiner

U.S. Cl. X.R.

34—22, 68; 56—1, 10